US012676947B2

(12) United States Patent
Richards et al.

(10) Patent No.: US 12,676,947 B2
(45) Date of Patent: Jul. 7, 2026

(54) PROJECTOR LIGHT SOURCE DIMMING USING METADATA FROM FUTURE FRAMES

(71) Applicant: Dolby Laboratories Licensing Corporation, San Francisco, CA (US)

(72) Inventors: Martin J. Richards, Gig Harbor, WA (US); Barret Lippey, Foster City, CA (US); Juan P. Pertierra, Fishers, IN (US); Dzhakhangir V. Khaydarov, Campbell, CA (US); Duane Scott Dewald, Dallas, TX (US); Nathan Shawn Wainwright, Melissa, TX (US); Darren Hennigan, Prosper, TX (US); John David Jackson, Allen, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 314 days.

(21) Appl. No.: 18/299,000

(22) Filed: Apr. 11, 2023

(65) Prior Publication Data

US 2023/0319244 A1     Oct. 5, 2023

Related U.S. Application Data

(63) Continuation of application No. 17/280,009, filed as application No. PCT/US2019/053024 on Sep. 25, 2019, now Pat. No. 11,632,527.

(60) Provisional application No. 62/882,894, filed on Aug. 5, 2019, provisional application No. 62/737,015, filed on Sep. 26, 2018.

(51) Int. Cl.
*H04N 9/31* (2006.01)
*G09G 3/20* (2006.01)

(52) U.S. Cl.
CPC ......... *H04N 9/3155* (2013.01); *G09G 3/2007* (2013.01); *H04N 9/3161* (2013.01); *H04N 9/3164* (2013.01); *H04N 9/3182* (2013.01); *G09G 2320/0626* (2013.01)

(58) Field of Classification Search
None
See application file for complete search history.

(56) References Cited

U.S. PATENT DOCUMENTS

| | | | |
|---|---|---|---|
| 7,404,645 | B2 | 7/2008 | Margulis |
| 8,411,022 | B2 | 4/2013 | Brown Elliott |
| 8,444,275 | B2 | 5/2013 | Kurtz |

(Continued)

FOREIGN PATENT DOCUMENTS

| | | |
|---|---|---|
| CN | 104956670 B | 9/2017 |
| CN | 106488157 B | 9/2020 |

(Continued)

OTHER PUBLICATIONS

Gong, Y. et al. "A Visual-Masking-Based Estimation Algorithm for Temporal Pumping Artifact Region Prediction" Mar. 1, 2017, Circuits, System and Signal Processing, vol. 36, Issue 3.

*Primary Examiner* — Matthew Yeung

(57) ABSTRACT

A projection display system comprises a light source configured to emit a light in response to a content data; an optical modulator configured to modulate the light; and a controller configured to adjust a light level of the projection display system based on the content data and a metadata relating to a future frame, thereby to reduce a perceptibility of a visual artifact.

16 Claims, 12 Drawing Sheets

(56) References Cited

U.S. PATENT DOCUMENTS

| | | | |
|---|---|---|---|
| 8,514,166 | B2 | 8/2013 | Chen |
| 8,860,891 | B2 | 10/2014 | Allen |
| 9,022,582 | B2 | 5/2015 | Kang |
| 9,462,215 | B2 | 10/2016 | Gorny |
| 9,482,877 | B2 | 11/2016 | Janssens |
| 9,773,473 | B2 | 9/2017 | Gallo |
| 9,961,313 | B2 | 5/2018 | Ogi |
| 2003/0231260 | A1 | 12/2003 | Pate |
| 2005/0017990 | A1 | 1/2005 | Yoshida |
| 2007/0035706 | A1* | 2/2007 | Margulis .............. H04N 9/3102 |
| | | | 353/122 |
| 2008/0225242 | A1 | 9/2008 | Sato |
| 2009/0322800 | A1 | 12/2009 | Atkins |
| 2011/0032266 | A1 | 2/2011 | Harbach |
| 2011/0175949 | A1 | 7/2011 | Wallener |
| 2012/0224121 | A1 | 9/2012 | Gilbert |
| 2013/0033685 | A1 | 2/2013 | Katou |
| 2013/0093803 | A1 | 4/2013 | Saitoh |
| 2013/0120234 | A1 | 5/2013 | Atkins |
| 2013/0148037 | A1 | 6/2013 | Whitehead |
| 2013/0201409 | A1 | 8/2013 | Yuzawa |
| 2013/0335682 | A1 | 12/2013 | Gilbert |
| 2014/0085190 | A1 | 3/2014 | Erinjippurath |
| 2014/0168287 | A1 | 6/2014 | Wallener |
| 2014/0333660 | A1 | 11/2014 | Ballestad |
| 2015/0124176 | A1 | 5/2015 | Gorny |
| 2015/0245043 | A1* | 8/2015 | Greenebaum ......... H04N 19/33 |
| | | | 375/240.25 |
| 2015/0365580 | A1 | 12/2015 | Kunkel |
| 2016/0139560 | A1 | 5/2016 | Gorny |
| 2016/0261832 | A1 | 9/2016 | Gorny |
| 2017/0025074 | A1 | 1/2017 | Farrell |
| 2017/0186380 | A1 | 6/2017 | Wallener |
| 2017/0316758 | A1 | 11/2017 | Atkins |
| 2018/0007327 | A1 | 1/2018 | Richards |
| 2018/0011365 | A1 | 1/2018 | Gilbert |
| 2018/0068637 | A1 | 3/2018 | Ninan |
| 2018/0098046 | A1 | 4/2018 | Husak |
| 2018/0164665 | A1 | 6/2018 | Gorny |
| 2018/0182306 | A1 | 6/2018 | Seong |
| 2018/0203339 | A1 | 7/2018 | Shkurikhin |
| 2018/0211440 | A1 | 7/2018 | Kunkel |
| 2018/0217485 | A1 | 8/2018 | Gorny |
| 2019/0072841 | A1 | 3/2019 | Okamura |
| 2019/0378468 | A1* | 12/2019 | Jinno ................... G09G 3/3413 |

FOREIGN PATENT DOCUMENTS

| | | | |
|---|---|---|---|
| JP | 2007121541 | A | 5/2007 |
| JP | 2009053476 | A | 3/2009 |
| JP | 2009512896 | A | 3/2009 |
| JP | 2010197416 | A | 9/2010 |
| JP | 2016538776 | A | 12/2016 |
| JP | 2016541142 | A | 12/2016 |
| JP | 2019047496 | A | 3/2019 |
| JP | 2022502920 | A | 1/2022 |
| KR | 20080075843 | A | 8/2008 |
| WO | 2012017899 | A1 | 2/2012 |
| WO | 2015066214 | | 5/2015 |
| WO | 2018/119161 | | 6/2018 |
| WO | 2018101097 | A1 | 6/2018 |
| WO | 2018/152063 | | 8/2018 |

* cited by examiner

1201 — Receive Content Data

1202 — Emit Light in Response to Content Data

1203 — Modulate Emitted Light

1204 — Adjust Light Level Based on Content Data and Future Frame Metadata

PROJECTOR LIGHT SOURCE DIMMING USING METADATA FROM FUTURE FRAMES

CROSS-REFERENCE TO RELATED APPLICATIONS

This application is a continuation of U.S. patent application Ser. No. 17/280,009, filed Mar. 25, 2021, which is a U.S. National Stage application under U.S.C. 371 of International Application No. PCT/US2019/053024, filed on Sep. 25, 2019, which claims the benefit of priority to U.S. Provisional Patent Application No. 62/882,894, filed Aug. 5, 2019, and to U.S. Provisional Patent Application No. 62/737,015, filed Sep. 26, 2018, each of which is hereby incorporated by reference in its entirety.

BACKGROUND

1. Field of the Disclosure

This application relates generally to projector display systems.

2. Description of Related Art

A projector display system typically includes a light source that illuminates a screen with an image that is modulated by some optical system within or on the projector. A projector includes a light source, which may include one or more light emitting elements such as lasers, Xenon lamps, arc lamps, light emitting diodes, etc. Light from the light source may be directed along an optical path which may include one or more optical components, such as lenses, modulators, beam expanders, beam splitters, irises, filters, and the like.

Light exiting the projector display system may be directed to a two-dimensional screen, such as a movie theater screen. The one or more modulators which may be included in the projector display systems selectively direct light to particular portions of the screen to generate an image, which may include comparatively bright portions and comparatively dark portions. The contrast ratio of a projector is a measurement of the capabilities of the projector display system, and is defined as the ratio between the peak brightness to the dark level of the display. Because an infinite contrast ratio is not technologically feasible, it may be technically difficult for a projector to simultaneously display a very bright image portion and an absolute black image portion.

Projector or other display systems including or relating to global dimming have been described in commonly-owned patents and patent applications, including:
U.S. Pat. Pub. No. 2018/0217485, titled "Single and Multi-Modulator Projector Systems with Global Dimming;"
U.S. Pat. Pub. No. 2018/0211440, titled "Surround Ambient Light Sensing, Processing, and Adjustment;"
U.S. Pat. Pub. No. 2018/0164665, titled "Light Recycling for Projectors with High Dynamic Range;"
U.S. Pat. Pub. No. 2018/0098046, titled "Targeted Display Color Volume Specification via Color Remapping Information (CRI) Messaging;"
U.S. Pat. Pub. No. 2018/0068637, titled "Dynamic Power Management for an HDR Display;"
U.S. Pat. Pub. No. 2018/0011365, titled "High Dynamic Range Displays Using Filterless LCD(s) for Increasing Contrast and Resolution;"

U.S. Pat. Pub. No. 2018/0007327, titled "Methods and Systems for High Dynamic Range Image Projectors;"
U.S. Pat. Pub. No. 2017/0316758, titled "High Dynamic Range Display Using LED Backlighting, Stacked Optical Films, and LCD Drive Signals Based on a Low Resolution Light Field Simulation;"
U.S. Pat. Pub. No. 2017/0186380, titled "Power Management for Modulated Backlights;"
U.S. Pat. Pub. No. 2016/0261832, titled "Single and Multi-Modulator Projector Systems with Global Dimming;"
U.S. Pat. Pub. No. 2016/0139560, titled "Projector Display Systems Having Non-Mechanical Mirror Beam Steering;"
U.S. Pat. Pub. No. 2015/0365580, titled "Global Display Management Based Light Modulation;"
U.S. Pat. Pub. No. 2015/0124176, titled "Enhanced Global Dimming for Projector Display Systems;"
U.S. Pat. Pub. No. 2014/0333660, titled "Mapping for Display Emulation Based on Image Characteristics;"
U.S. Pat. Pub. No. 2014/0168287, titled "Power Management for Modulated Backlights;"
U.S. Pat. Pub. No. 2014/0085190, titled "Display, Imaging System and Controller for Eyewear Display Device;"
U.S. Pat. Pub. No. 2013/0335682, titled "High Contrast Grayscale and Color Displays;"
U.S. Pat. Pub. No. 2013/0120234, titled "High Dynamic Range Display Using LED Backlighting, Stacked Optical Films, and LCD Drive Signals Based on a Low Resolution Light Field Simulation;"
U.S. Pat. Pub. No. 2012/0224121, titled "High Dynamic Range Displays Using Filterless LCD(s) for Increasing Contrast and Resolution;"
U.S. Pat. Pub. No. 2011/0175949, titled "Power Management for Modulated Backlights;" and
U.S. Pat. Pub. No. 2009/0322800, titled "Method and Apparatus in Various Embodiments for HDR Implementation in Display Devices;"
the entire contents of which are each herein incorporated by reference in their entirety.

BRIEF SUMMARY OF THE DISCLOSURE

Various aspects of the present disclosure relate to devices, systems, and methods for global dimming in a projector to reduce the perceptibility of visual artifacts.

In one exemplary aspect of the present disclosure, there is provided a projection display system comprising a light source configured to emit a light in response to a content data; an optical modulator configured to modulate the light; and a controller configured to adjust a light level of the projection display system based on the content data and a metadata relating to a future frame, thereby to reduce a perceptibility of a visual artifact.

In another exemplary aspect of the present disclosure, there is provided a non-transitory computer-readable-medium storing instructions that, when executed by a processor of a projection display system comprising a light source and an optical modulator, cause the projection display system to perform operations comprising receiving a content data; emitting a light, by the light source, in response to the content data; modulating the light, by the optical modulator; and adjusting a light level of the projection display system based on the content data and a metadata relating to a future frame, thereby to reduce a perceptibility of a visual artifact.

In this manner, various aspects of the present disclosure provide for global dimming in a projector display system using psycho-visual masking, and effect improvements in at least the technical fields of image projection, signal processing, and the like.

DESCRIPTION OF THE DRAWINGS

These and other more detailed and specific features of various aspects are more fully disclosed in the following description, reference being had to the accompanying drawings, in which.

DETAILED DESCRIPTION

Figure 1:
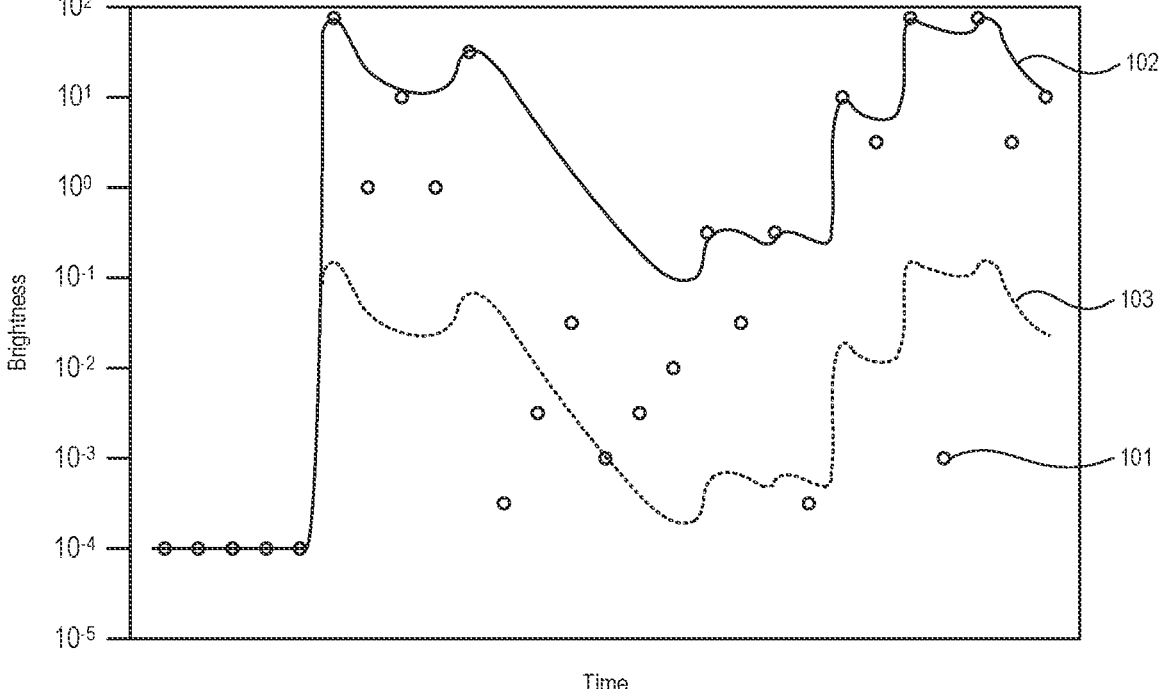
FIG. 1 illustrates a graph of an exemplary dimming technique according to various aspects of the present disclosure.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to reduce or attenuate the perceptibility of a visual artifact; for example, microscopy, image sensing, telecommunications, non-projection image display, and so on.

Dimming Techniques

As used herein, "global dimming" refers to a technique where the overall light level of a light source for a projector is changed depending upon the content. For bright scenes, the light level of the source is increased, and for dim scenes the level is decreased. This can be done in a variety of ways including via an iris, variable density filters, and modulation of the light source itself. Furthermore, this may be done using hardware components, software components, firmware, or a combination thereof. In one example, global dimming (such as any one or more of the following techniques) may be implemented by a variable multi-input analog or digital low pass filter function using metadata parameters as the input to this function.

Global dimming systems may suffer from undesirable visual artifacts. For example, consider a very dark scene where a relatively small bright light such as a stop light blinks slowly. In this case, an undesirable artifact due to pumping of the dark level may be present. If the modulator has limited dynamic range, the dark level in the scene will increase when the light is on, and decrease when the light goes dim; in other words, the projector dark level is proportional the source level. Since the bright light is small, it does not provide significant masking for the rest of the scene, and the projector dark level changes are readily visible. The artifacts become less visible with a projector with a higher base (simultaneous) contrast, but may still be readily seen. A projector typically used in Digital Cinema (DCI) projectors is around 2000:1, while enhanced DCI projectors may have 8000:1 or higher. For example, a projector with a base simultaneous contrast ratio over 1,000, 000:1 may benefit less from global dimming, and artifacts from it may not be visible, but projectors with contrast ratios (CRs) around 50,000:1 may benefit from global dimming, and the projector dark level pumping may still be perceived.

However, it is possible to mask these visual artifacts so that they are not perceived by an observer, or are only slightly perceived. This masking may be achieved through the use of various techniques based on the human visual system thereby to reduce the visibility of these effects.

Technique 1—Slow Dimming

According to a "slow dimming" technique, when a bright light appears, the source light is increased to allow the brightest part of the scene to be at the correct or desired brightness. FIG. 1 illustrates a slow dimming technique. Specifically, FIG. 1 illustrates a brightness level of a projector display system as a function of time. In FIG. 1, a series of peak levels 101 are shown, which correspond to the peak brightness level in an image in a given frame. Curve 102 illustrates a capacity of a projector display system; that is, a peak white level a projector display system is able to display at a given time. Curve 103 illustrates a dark level the projector display system is able to display at the given time. In the particular example illustrated in FIG. 1, the projector display system has a 1000:1 base contrast ratio; thus, the dark level curve 103 is $\frac{1}{1000}$ of the peak white level curve 102. When the light disappears, the level of the source light slowly decreases. When the bright light in the scene reappears, the source light is quickly increased to allow the bright object to be shown at its correct level. In this manner, the source light is adjusted such that the rate-of-change of the brightness is smoothed. The projector dark level pumping may be still visible, especially on the faster dark to light transition, but it is less perceivable because humans do not notice slow changes as readily as faster changes. Also, one need not dim the source such that the brightest part of the scene is just covered by the light source. For example, if the scene jumps from having a bright area at 100 nits to 0.01 nits, one need not reduce the source light by a factor of 10,000. A smaller reduction (partial dimming) can be used and it will reduce the pumping effect; however, partial dimming may have lower effectiveness in reducing the projector dark level.

If the bright areas are small, it may be advantageous to have a lower source light level than that which would be used to reproduce these areas in full detail. This will result in saturation and loss of detail on the bright objects, but result in a lower projector dark level. In many cases this is a desirable tradeoff, as detail in small bright objects is not easily visible to observers. Based upon analysis of the image and knowledge of the human visual system, one can determine the proper level to use. This is called small bright object (SBO) compensation.

Another consideration is that light from the screen reflects from the walls of the auditorium and back to the screen. This results in a dark level that is proportional to the total energy of the image on the screen. It is not strictly necessary to keep the dark level of the projector much below the room reflectance dark level, so adjustments of the algorithm to determine the source level can take this into consideration. This is called "room reflection compensation." Because the amount of light reflected from the walls of the auditorium is based, at least in part, on the amount of light reflected from the screen, the algorithm for room reflection compensation may also incorporate an adjustment based on the screen gain.

The speed of the dimming may be variable depend on one or more internal or external factors. For example, in instances where there is a small bright object plus a high average pixel level (APL) and/or a high level of room reflection or ambient light, it may be preferable to provide comparatively "fast" dimming as compared to instances where there is a low APL and/or a low level of room reflection or ambient light.

In addition to room reflection compensation, it is also possible to compensate for the dark level from the projector, which is dependent on the total energy of the image being produced by the projector. This level is produced by, for example, scattering in optical surfaces within the projector (for example, by the projection lens). This may be referred to as "lens veiling glare" or "veiling glare dark light." Because both the room reflection dark light and the veiling glare dark light are dependent upon the APL, the effects may be combined into a single term for purposes of analysis and compensation.

Furthermore, it is also possible to compensate for the effects of ambient light in the theater, or "room ambient dark light." If the ambient light level is high, there is a reduced need to provide a large degree of global dimming at least because the ambient light effect would dominate. The degree of dimming may also be affected by the contrast ratio of the image being projected. That is, there are diminishing returns when producing an image from the projector/room system that has a significantly higher contrast than what is specified in the image data. From the image data, it is possible to calculate the darkest pixel in a scene to determine the dark level that would be in fact exhibited on the screen. The result of this calculation may be added to the data used for calculating the amount of dimming.

The global dimming algorithm may also be reset or reinitialized at the time of a scene change in the image data. For example, the source level may be immediately reset to the peak level of the image upon scene change, and various parameters of the low pass filter may change as appropriate to the new image sequence. The time of scene change may be determined dynamically (for example, by monitoring the image data in a current or future frame) or may be flagged by metadata included with the image data.

The perceptibility of visual artifacts may also be influenced by audio. For example, higher sound pressures (for example, a scene with a loud explosion) may reduce the ability of the human visual system to perceive low level dark areas; therefore, a smaller degree of global dimming may be used for periods during which the soundtrack has a high volume. In this manner, an additional parameter used to influence global dimming may be the sound pressure level.

Figure 2:
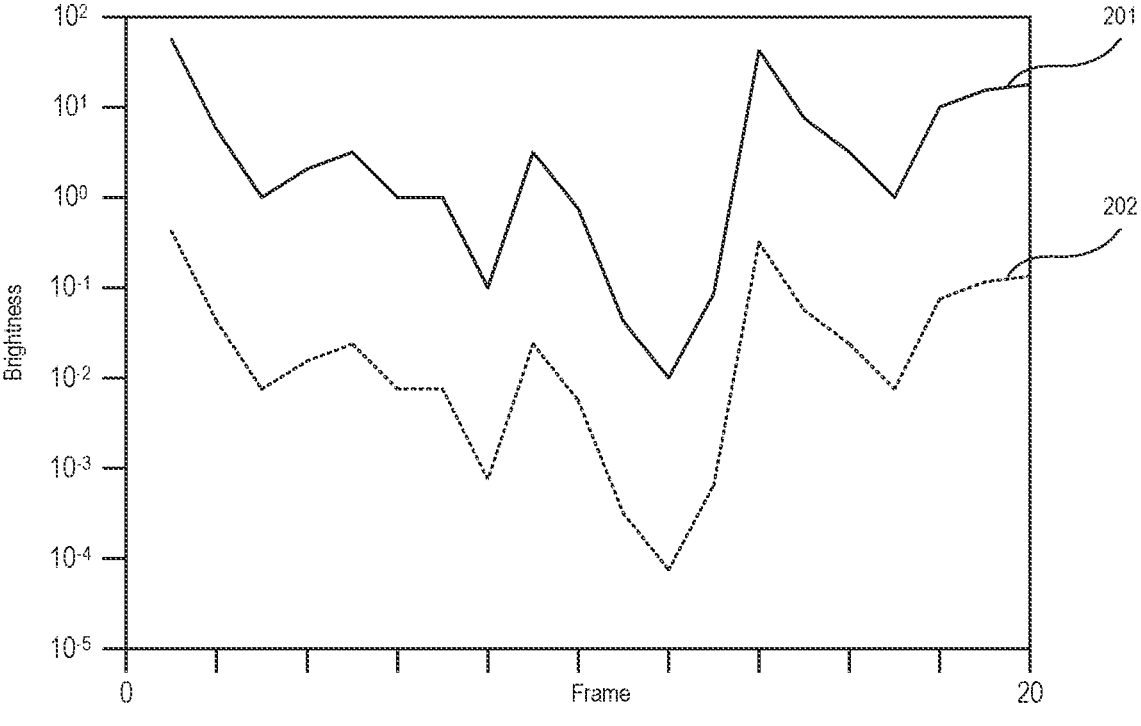
FIG. 2 illustrates a graph of an exemplary relationship between a projector and a room according to various aspects of the present disclosure.

Preferably, many or all of the above components should be considered when determining the particular degree and type of global dimming to be applied. That is, the degree and type of global dimming should be calculated so as to minimize the amount of dimming utilized to only that which is necessary to match the sum of all the dark levels produced by the system. FIG. 2 illustrates an example of this for a particular (and arbitrary) frame sequence. In FIG. 2, the upper line 201 represents the total light on the screen; that is, the APL. The lower line 202 represents the light reflected from the room and scattered from the projection lens onto the screen. As illustrated in FIG. 2, the light reflected provides a contribution of approximately 0.7% as representative of typical auditorium conditions.

Technique 2—Slow Dimming with Look-Ahead

In a "slow dimming with look-ahead" technique, the projector has information about the future peak level of frames. This information may be contained in metadata, or determined by pre-reading the frames in advance of playback. Similar to the general slow dimming technique, the source light changes slowly. Because the projector has information on future frames, this allows the source light to increase slowly before the bright light appears, further reducing the visibility of the dark pumping. Additionally, the slope or speed of the change from one state to another could be different for different levels and content, depending upon measurements and observations from viewers to determine the correct transition rate and shape. In some cases the transitions could be very slow, on the order of minutes, and track the accommodation rate of the human visual system. Partial dimming, SBO compensation, and room reflection compensation can also be used in this technique.

Figure 3:
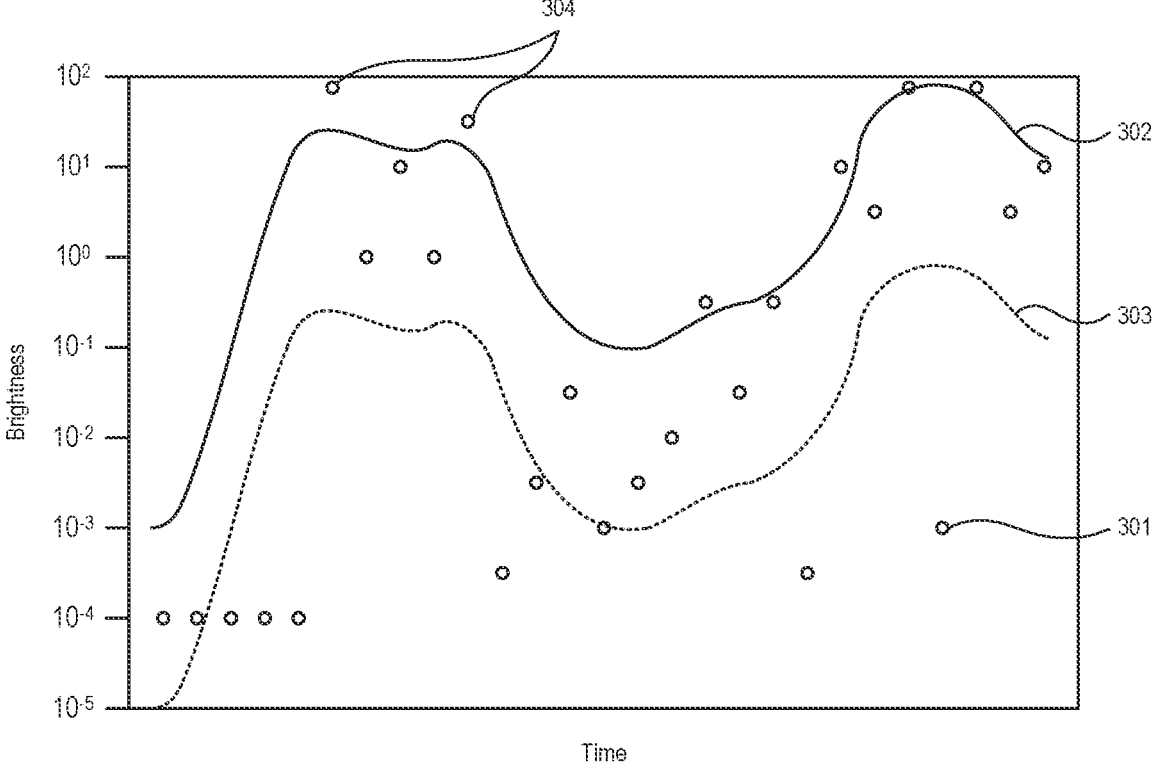
FIG. 3 illustrates a graph of another exemplary dimming technique according to various aspects of the present disclosure.

FIG. 3 illustrates a brightness level of a projector display system that incorporates partial diming and SBO clipping, as a function of time. In FIG. 3, a series of peak levels 301 are shown, which correspond to the peak brightness level in an image in a given frame. Curve 302 illustrates a capacity of a projector display system; that is, a peak white level a projector display system is able to display at a given time. Curve 303 illustrates a dark level the projector display system is able to display at the given time. In the particular example illustrated in FIG. 3, the projector display system has a 1000:1 base contrast ratio; thus, the dark level curve 303 is $\frac{1}{1000}$ of the peak white level curve 302. As compared with the technique illustrated in FIG. 1, FIG. 3 shows that the brightness level of the projector display system may be increased in advance of a comparatively bright frame or frame portion. Such an increase may allow for a slower change and thus a less-perceivable degree of projector dark level pumping. In FIG. 3, two of the peak levels 304 correspond to SBOs. Using the future frame data, the projector display system clips the SBOs such that a peak white level for the frame containing the SBOs is below the actual peak levels 304. This may allow for a lower dark level and thus a frame reproduction that appears to the viewer to contain fewer visual artifacts.

Technique 3—Dimming with Dynamic Range Compression

Techniques 1 and 2, both directed to "slow dimming," result in single images that during the steady state condition have the dynamic range of the base projector (except when partial dimming is used). In a dimming technique with

7

Figure 4:
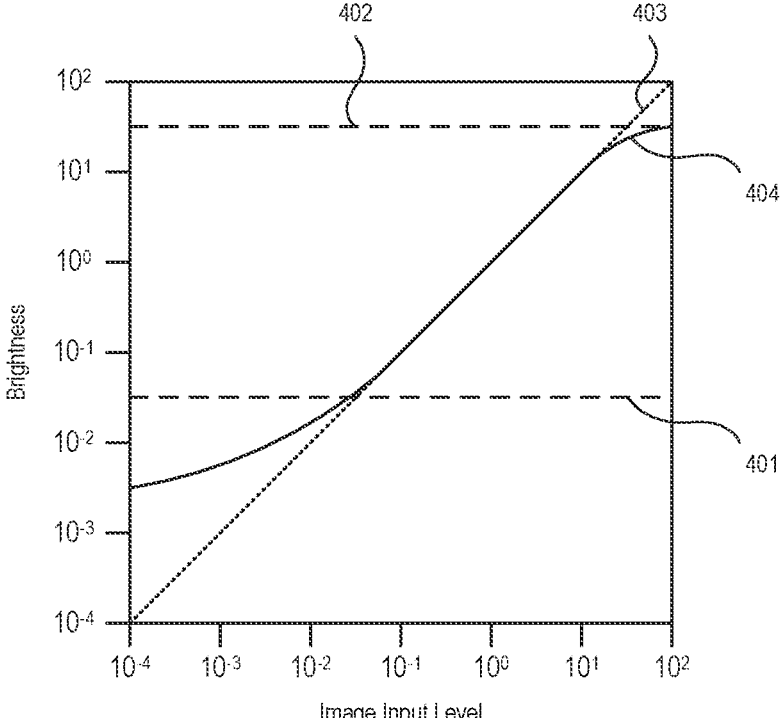
FIG. 4 illustrates a graph of an exemplary tone curve according to various aspects of the present disclosure.

"dynamic range compression," especially during the transitions, the dynamic range is decreased. This results in images where the image dark detail comes and goes depending upon the global dimming level. With bright scenes where the source level is high, image dark detail is obscured by the projector dark level. At lower levels, when the bright light is not present and the source level and projector dark level decreases, the image dark detail re-appears. One solution to alleviate this effect is to change the shape of the tone curve dynamically during the transitions, and with different steady state condition. FIG. 4 illustrates such a tone curve. In FIG. 4, the brightness (that is, the output level) is shown as a function of the image input level for a single frame at full brightness. Dashed line 401 corresponds to the projector dark level and dashed line 402 corresponds to the projector peak level. If an unmodified tone curve 403 were implemented, the brightness would simply correspond to the image input level in a linear fashion. By providing a modified tone curve 404, however, it is possible to allow enhanced dark image detail (for low image input levels) and/or allow SBO detail (for high image input levels).

That is, an example would be to increase the levels of the dark parts of the image which would normally be obscured by the projector dark level when there is (small area) bright content on screen and a high source level. The tone curve would revert to linear when there is no bright content, and the source level (and projector dark level) is low. Variations with different shaped tone curves, including shapes that affect the bright content could also be advantageous. For example, if there are small bright objects, it might be advantageous to have a sigmoid shape to allow for detail on the small bright objects (at a lower modulation depth), while using a lower source level similar to what was described in technique 1, but without the loss of detail.

Technique 4—Tuned Dimming

It is also possible to incorporate "human tuned" dimming. This may be achieved through the any of the above techniques as well as human tuning to generate metadata in the mastering or color grading process that explicitly controls the source levels. Alternatively, one may use any of the techniques above and human tuning to provide metadata that will guide an algorithm in the projector that determines the appropriate level for the source. The provided metadata may include information for the use of multiple techniques so as to be utilized by projectors which have different features. For example, the provided meta data may include a first set of information for use in projectors which support look-ahead, a second set of information for use in projectors which support partial dimming, a third set of information for use in projectors with no additional feature support, etc.

The above techniques may be used together. For example, it is possible to use a slow dimming technique (with or without look-ahead) in combination with dynamic range compression and/or human tuning. The combined technique may be further refined with the inclusion of one or more of SBO compensation, partial dimming, or room reflection compensation.

Moreover, while FIGS. 1 and 3-4 illustrate a tone curve showing the illumination levels of an image compared with the peak and dark levels of a projector, it is possible to vary the color components of the image individually in a hue-preserving manner. For example, if a small bright object is red, it is possible to apply a tone curve as illustrated in FIGS. 1 and 3-4 to red light in the projector while not applying such a curve to blue or green light.

In the above techniques, various parameters (for example, characteristics relating to the room reflection, ambient light, and the like) may be measured and input to the algorithm for calculation of the dimming in real time. Alternatively, the various parameters may be measured and input to the algorithm manually at the time of calibration. In some aspects of the present disclosure, some parameters may be measured and input at the time of calibration while other parameters are measured and input in real time.

Examples

FIGS. 5-10 illustrate examples of dark level contributions for a series of particular projectors and rooms. Details of the projectors and room configurations are set forth in the following Table 1:

| Configuration | MPPL | PBCR | RRR | ADL | SFRR |
|---|---|---|---|---|---|
| Example 1 | 100 | 50000 | 0.007 | 0.001 | 3 |
| Example 2 | 100 | 5000 | 0.007 | 0.001 | 3 |

In Table 1, "MPPL" refers to the maximum projector peak level in nits; PBCR refers to the projector base contrast ratio (1600:1 for DCI 4K); RRR refers to the room reflectance ratio (APL: room reflectance dark level), and includes the veiling glare term; ADL refers to the ambient dark level; and SFRR refers to a safety factor for room reflection and ambient light. The safety factor is a margin that the particular global dimming algorithm uses to determine how far down from the combined dark level it puts the projector dark light. This defines how much more dark light (of the combined dark light) will be contributed by the projector. The above values are merely exemplary.

Figure 5:
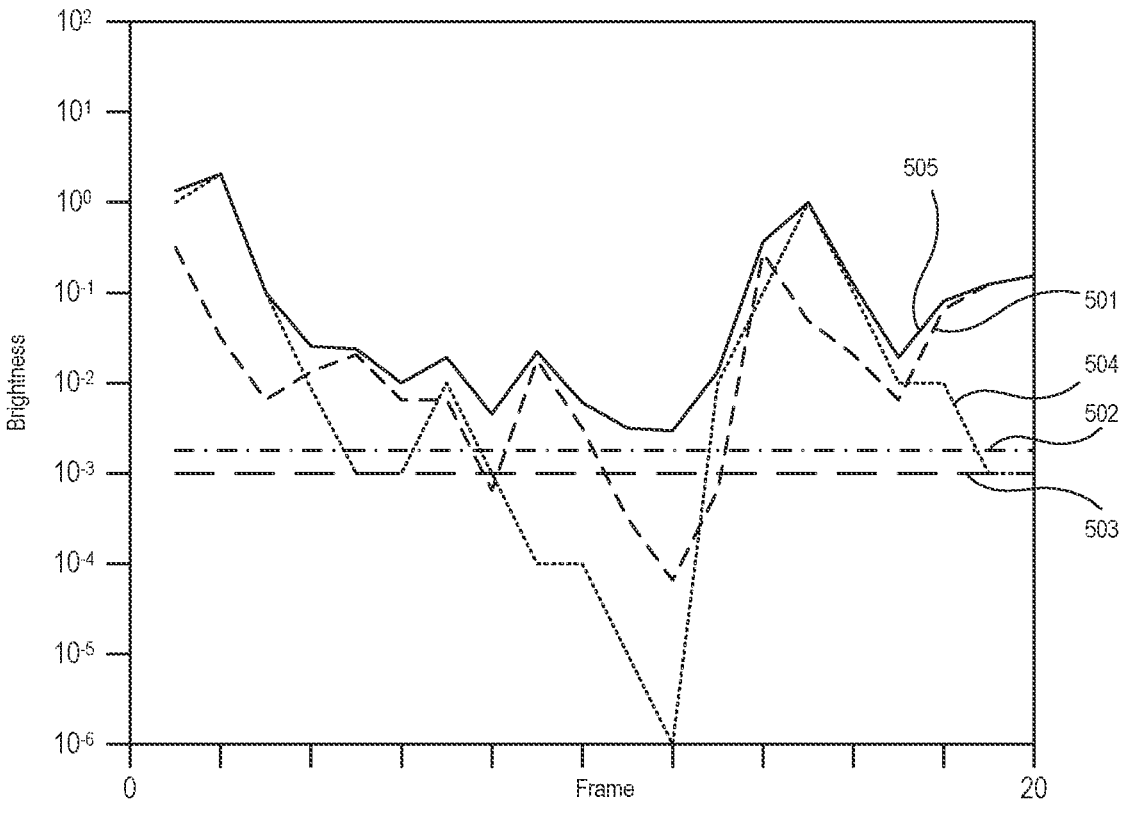
FIGS. 5-10 respectively illustrate graphs of various dark levels for exemplary projectors according to various aspects of the present disclosure.

FIG. 5 illustrates all dark level contributions for Example 1, which is a high contrast (50000) projector. Specifically, FIG. 5 illustrates the room reflection/veiling glare dark level contribution (dashed line 501), the projector dark level contribution (dash-dot line 502), the room ambient dark level contribution (long-dashed line 503), the image dark level contribution (short-dashed line 504), and the sum of all dark level contributions (solid line 505).

Figure 6:
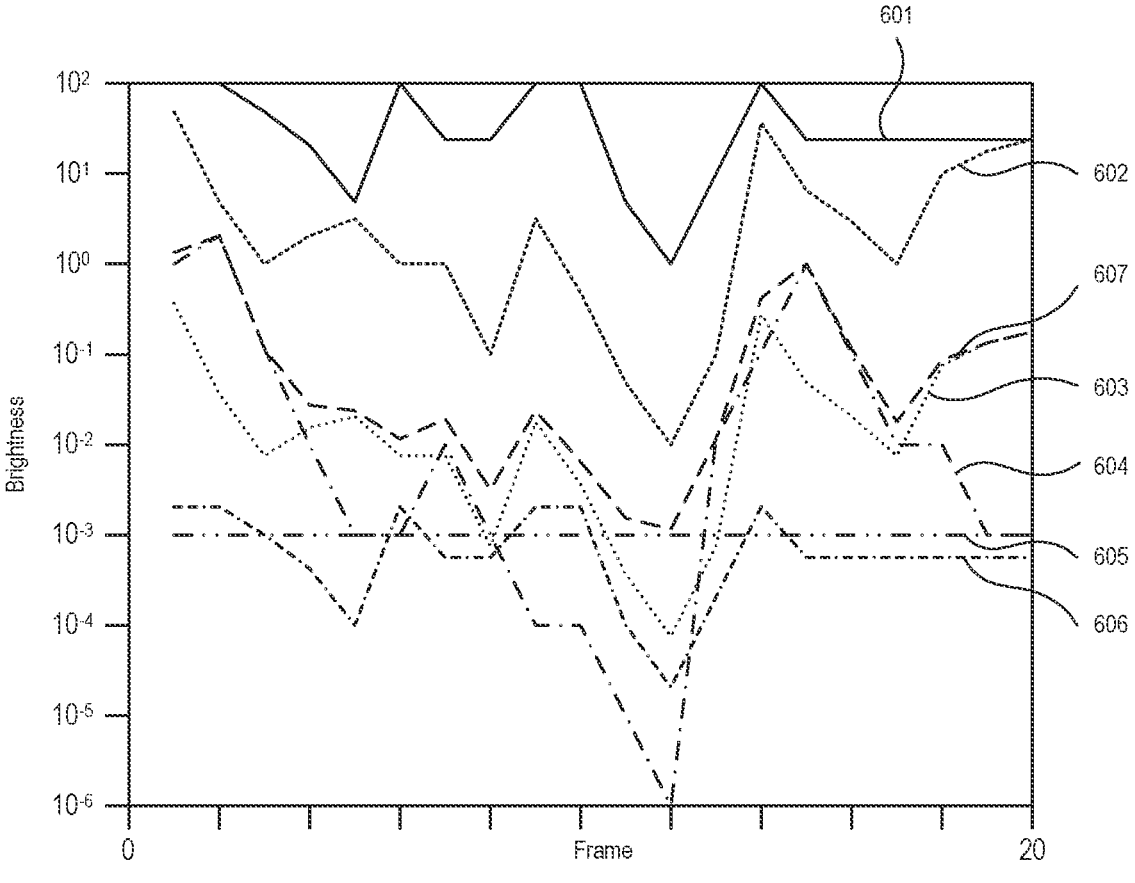

FIG. 6 illustrates the effect of basic global dimming on Example 1. In the particular illustration of FIG. 6, the global dimming algorithm corresponds to an instantaneous method in which the source level directly tracks the peak level of the image for each frame. This may be referred to as instantaneous global dimming or "max peak" global dimming. The instantaneous method was chosen for ease of explanation. FIG. 6 illustrates the projector peak level and image peak level (solid line 601), the APL (short-dashed line 602), the room reflection/veiling glare dark level contribution (dotted line 603), the image dark level contribution (dash-dot line 604), the ambient dark level contribution (dash-dot-dot line 605), the projector dark level contribution (dash-dash-dot line 606), and the sum of all dark level contributions (dashed line 607).

As can be seen from FIG. 6, the projector system provides an image that is close to what could be obtained in that room for most frames. The projector dark level contribution 606 does not significantly contribute to the sum 607. The room reflection/veiling glare dark level contribution 603 dominates the system for the most part. During frames 1-4, the image dark level contribution 604 dominates. In this illustration, the global dimming algorithm provides a large amount of change to the projector peak level 601. For example, the ratio of frame 14 to frame 12 is 100:1. This may cause visible dark level pumping in the darker scenes.

Figure 7:
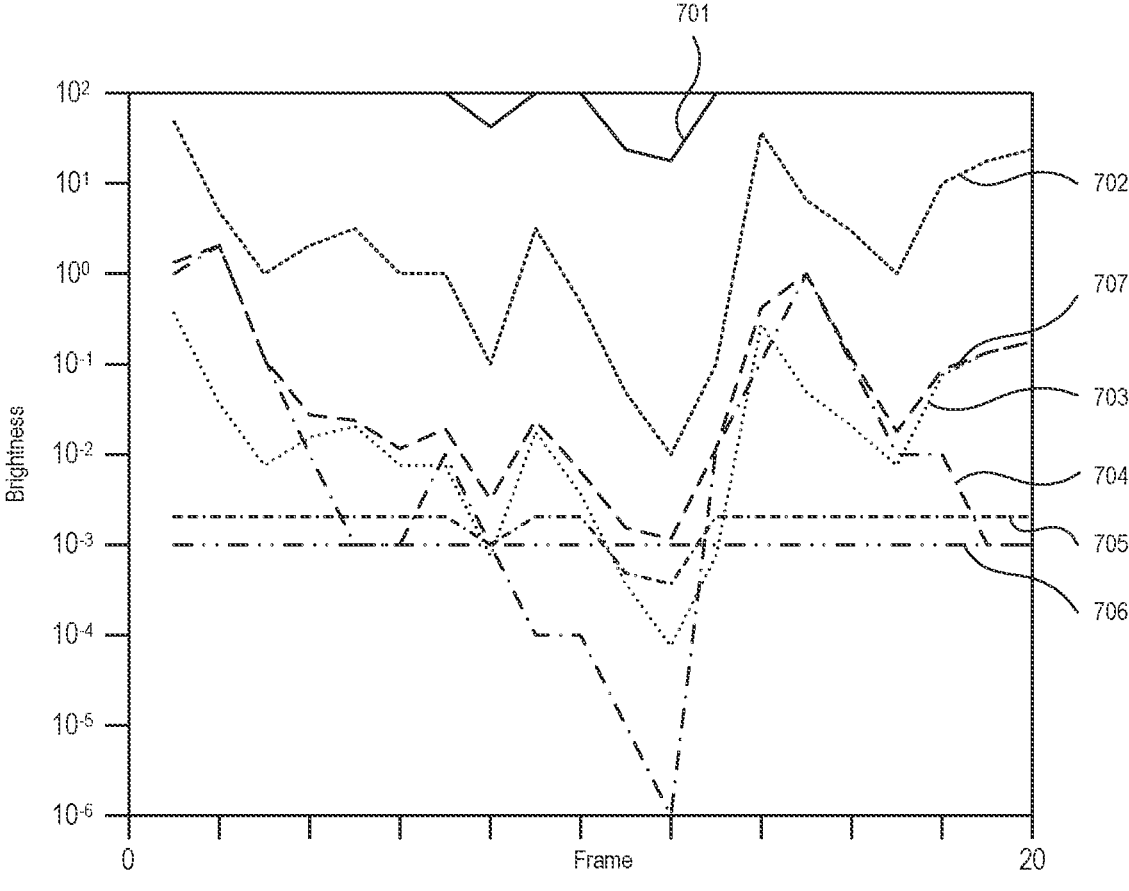

For comparison, FIG. 7 illustrates the effect of using compensation for the room reflection/veiling glare, ambient, and image dark level contributions in the global dimming algorithm in Example 1. In FIG. 7, the projector peak level and image peak level (solid line 701), the APL (short-dashed line 702), the room reflection/veiling glare dark level contribution (dotted line 703), the image dark level contribution (dash-dot line 704), the ambient dark level contribution (dash-dot-dot line 705), the projector dark level contribution (dash-dash-dot line 706), and the sum of all dark level contributions (dashed line 707) are shown. Comparing APL 702 of FIG. 7 to APL 602 of FIG. 6, it can be seen that the results are substantially the same. That is, the peak levels of the image are approximately the same in FIGS. 6 and 7; however, in the case of FIG. 7 the projector did not implement as large a degree of source dimming to achieve the same goal. This may be referred to as the "least dimming" principle. The idea underlying the least dimming principle is to only dim the projector by the smallest amount in order to have substantially the same results as could be obtained by full dimming, taking into consideration the other sources of dark light on the screen.

Figure 8:
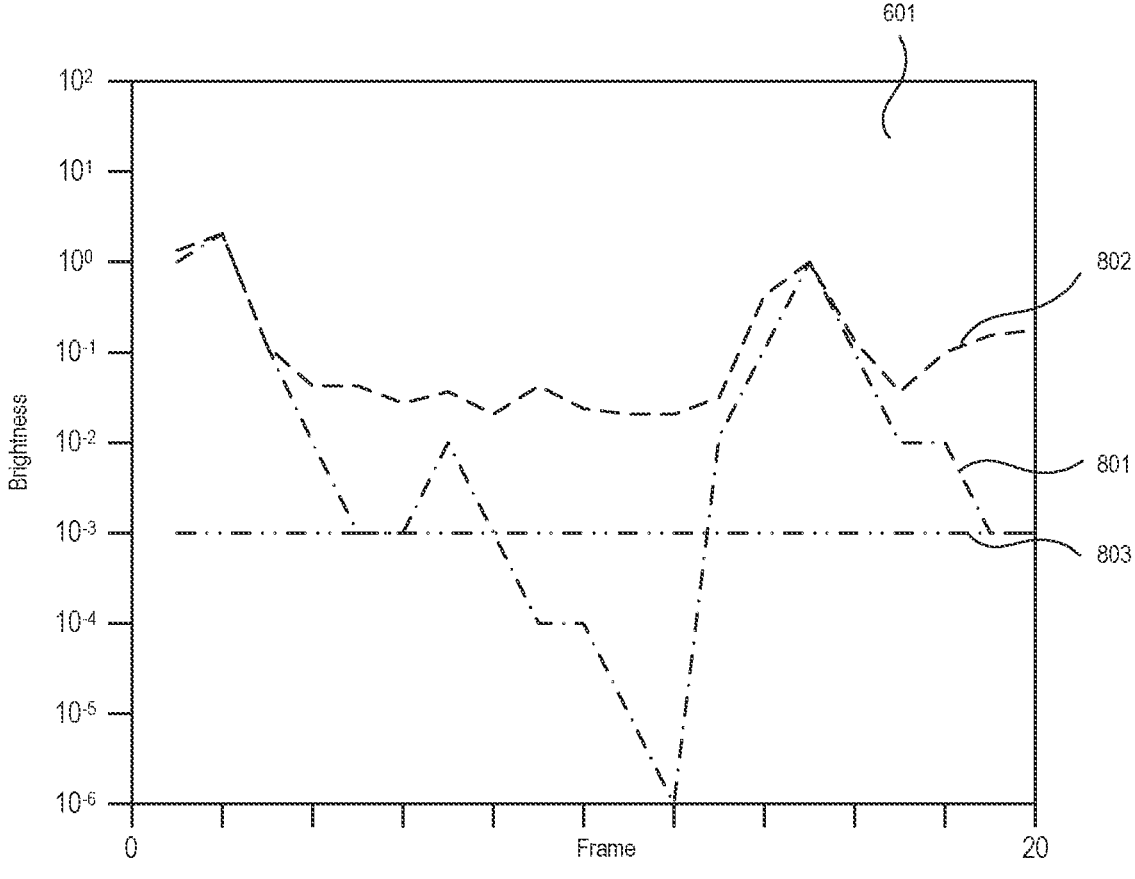
Figure 9:
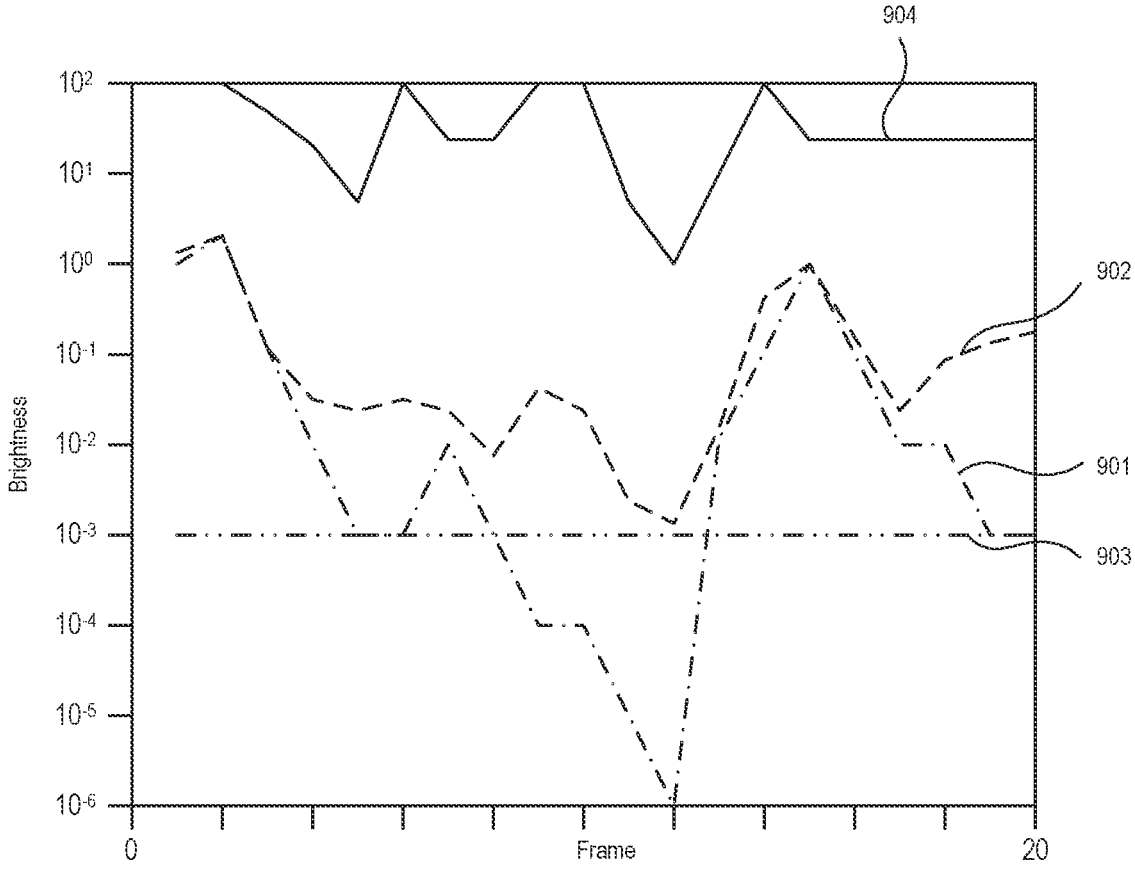
Figure 10:
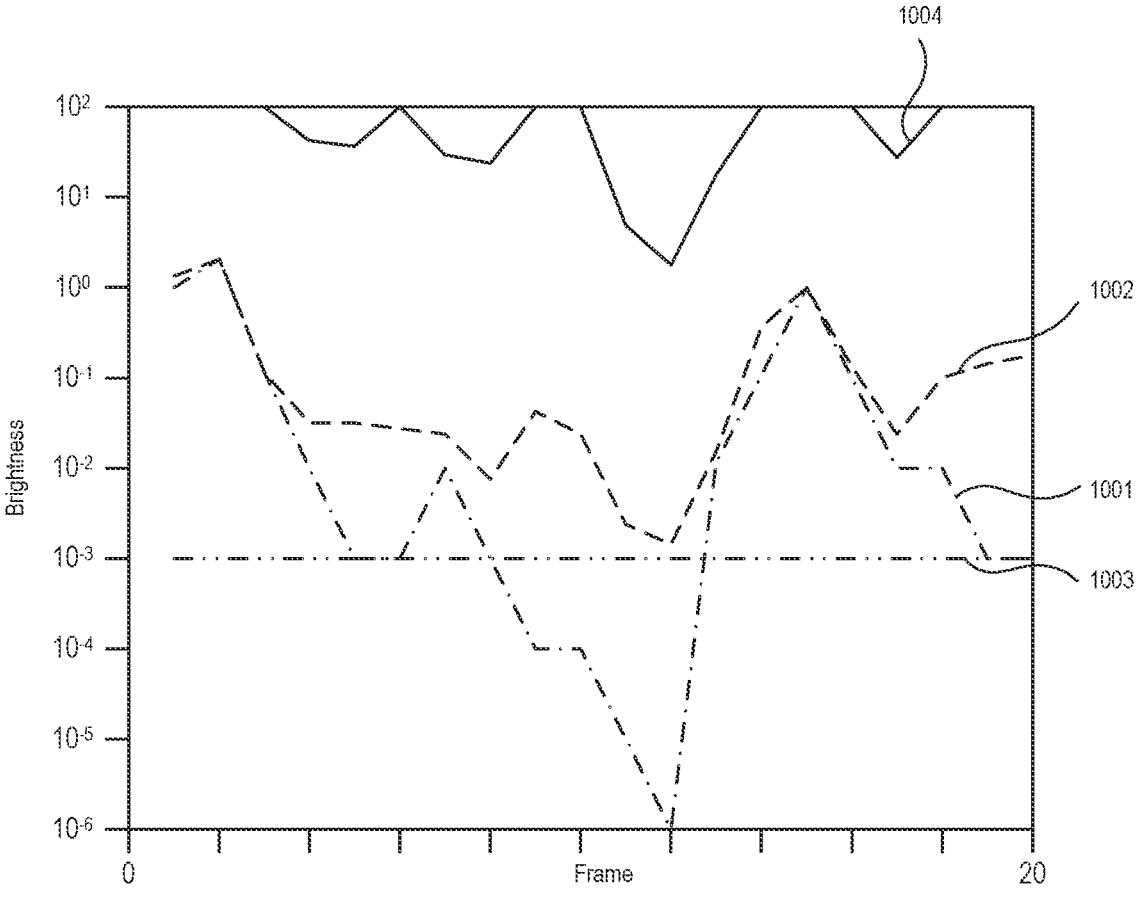

FIGS. 8-10 illustrate simplified versions of the dark level contributions, instantaneous global dimming, and compensated global dimming ("least dimming") for Example 2, which is a comparatively-lower contrast (5000) projector as compared to Example 1. FIGS. 8-10 may be considered simplified analogues to FIGS. 5-7, respectively.

FIG. 8 illustrates the desired dark level in the image (dash-dot line 801), the actual dark level on the screen (dashed line 802), and the ambient dark level (dash-dot-dot line 803). In FIG. 8, no global dimming is performed. FIG. 9 illustrates the desired dark level in the image (dash-dot line 901), the actual dark level on the screen (dashed line 902), the ambient dark level (dash-dot-dot line 903), and the projector peak level (solid line 904). In FIG. 9, instantaneous global dimming is performed. FIG. 10 illustrates the desired dark level in the image (dash-dot line 1001), the actual dark level on the screen (dashed line 1002), the ambient dark level (dash-dot-dot line 1003), and the projector peak level (solid line 1004). In FIG. 10, least global dimming is performed.

Collectively, FIGS. 8-10 illustrate that least global dimming performs about as well as max peak global dimming, but may utilize less dimming of the source. With the lower contrast ratio projector (Example 2), however, the least global dimming algorithm includes more modulation than with the higher contrast ratio projector (Example 1). In situations where the room is very dark with high contrast content, and where the projector base contrast ratio is low, the least dimming algorithm becomes more and more like the max peak dimming algorithm; moreover, in situations where the room is not dark or the image content is low contrast with a high base contrast ratio projector, the least dimming algorithm stops modulating altogether, as it may not be needed.

Projector Display Systems

Figure 11:
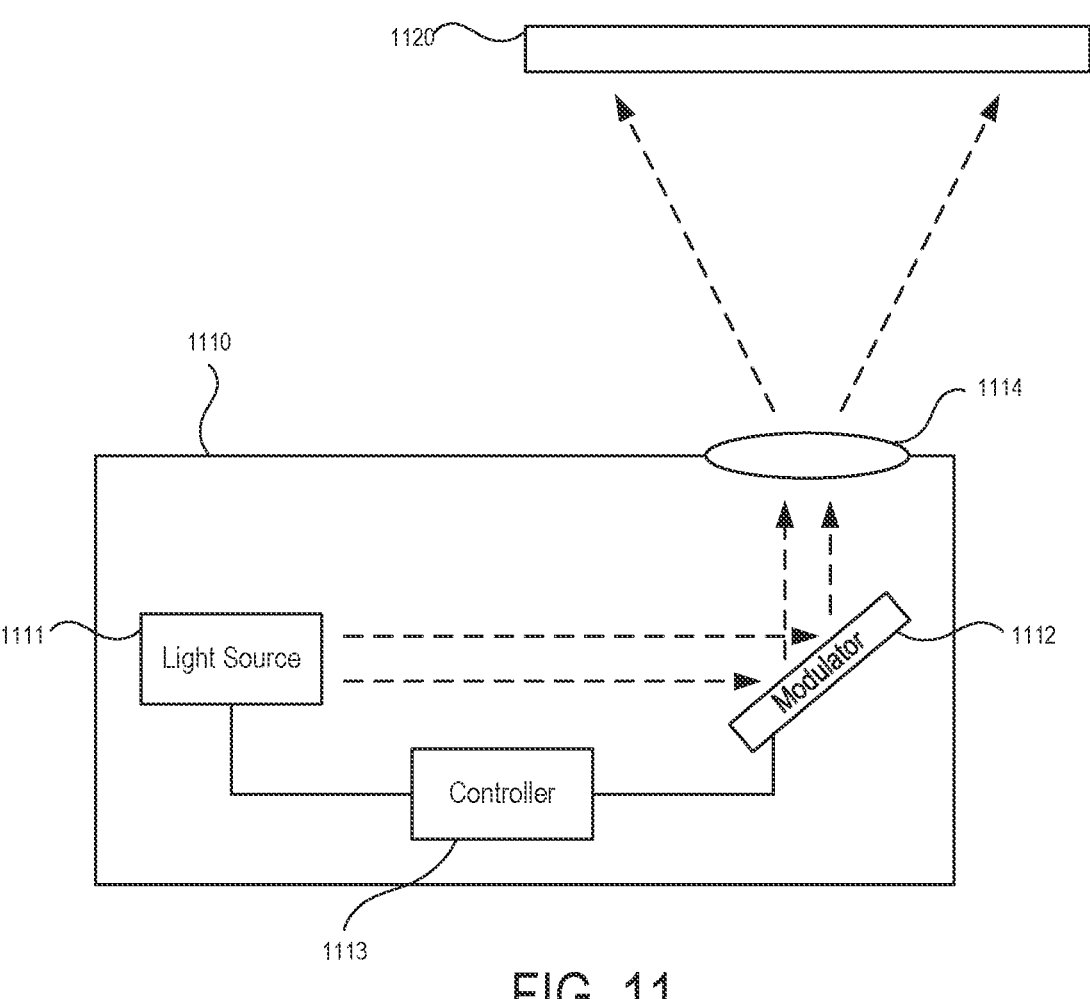
FIG. 11 illustrates a block diagram of an exemplary projector display system according to various aspects of the present disclosure.

FIG. 11 illustrates an exemplary projection system according to various aspects of the present disclosure. Specifically, FIG. 11 illustrates a projector 1110 which includes a light source 1111, an optical modulator 1112, a controller 1113 operatively connected to the light source 1111 and the optical modulator 1112, and projection optics 1114. The projector 1110 projects light toward a screen 1120. In practice, the projector 1110 may include additional components such as a memory, input/output ports, communication circuitry, a power supply, and the like. Furthermore, the projector 1110 may include additional optical components such as mirrors, lenses, waveguides, optical fibers, beam splitters, diffusers, additional spatial light modulators (SLMs), and the like. For ease of explanation, these additional components are not illustrated here.

The light source 1111 may be, for example, a laser light source, a high-pressure discharge lamp, an LED, and the like. In some aspects of the present disclosure, the light source 1111 may comprise multiple light sources 1111, each corresponding to a different wavelength or wavelength band. The light source 1111 emits light in response to an image signal provided by the controller 1113. The controller 1113 may be, for example, a processor such as a central processing unit (CPU) of the projector 1110. In one example, the optical modulator 1112 may be an SLM, including a reflective SLM or a transmissive SLM. The optical modulator 1112 may be a liquid-crystal-on-silicon (LCOS) SLM, a digital micromirror device (DMD), a light valve, and the like. The controller 1113 also controls the optical modulator 1112, which receives light from the light source 1111. The optical modulator 1112 imparts a spatially-varying modulation, such as a phase modulation, to the light, and redirects the modulated light toward the projection optics 1114. The projection optics 1114 may include one or more lenses and/or other optical components, thereby to cause light from the light source 1111 to form an image on the screen 1120.

In some aspects of the present disclosure, the projector 1110 may include one or more sensors in order to determine various parameters (for example, characteristics relating to the room reflection, ambient light, and the like) in real time. In other aspects of the present disclosure, one or more sensor may be provided external to the projector 1110, and the projector may include components (for example, the input/output ports mentioned above) to receive parameter data from the sensor(s) in real time. A parameter sensed in real time may be stored in a memory, such as a RAM. Where a parameter is not sensed or determined in real time, the data may be manually entered at a time of calibration and stored in memory, such as a hard disk. Different parameters may be sensed or determined in different ways, such that some parameters are determined by internal sensors, others are determined by external sensors, and others still are manually entered at a time of calibration.

Projector Display Methods

Figure 12:
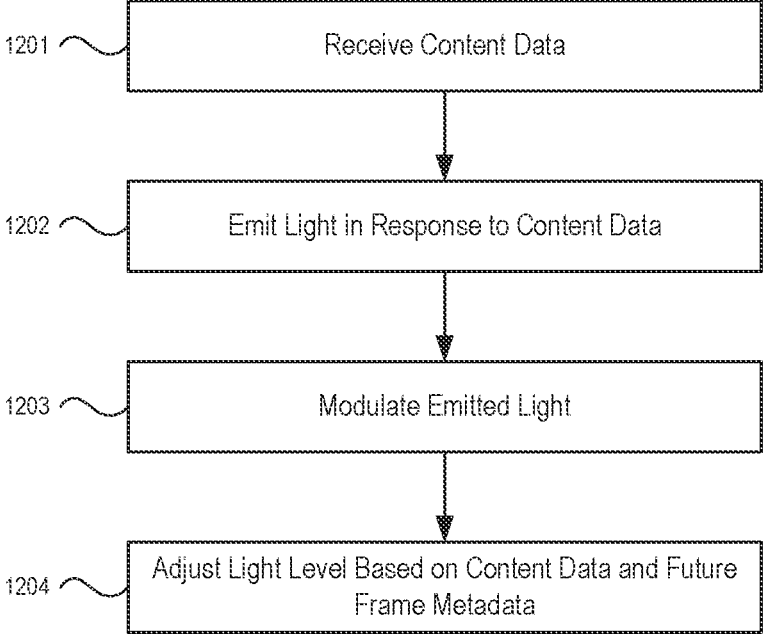
FIG. 12 illustrates a process flow for an exemplary projector display method according to various aspects of the present disclosure.

An exemplary projector display method is illustrated in FIG. 12. The exemplary method may be performed or caused to be performed using a non-transitory computer-readable-medium storing instructions that, when executed by an electronic processor, cause one or more of the operations described in FIG. 12 to be performed. A non-transitory computer-readable-medium includes any element configured to temporarily, permanently, or semi-permanently store data; for example, a RAM, a hard disk, a removable storage device such as flash memory, an optical disk, and the like. The exemplary method may be performed in or by a projector display device, such as the projector 1110 described above with regard to FIG. 11.

At step 1201, the projector display device receives content data. The content data may be received from an external data source by, for example, a wired or wireless connection. The content data may also be received from an internal data source, such as an internal storage device or a removable storage medium. In some aspects of the present disclosure, the content data is received by a controller of the projector display device, such as the controller 1113 described above with regard to FIG. 11. After receiving the content data, at step 1202, the projector display device emits light in response to the content data. In one example, the controller 1113 causes the light source 1111 to emit light with a brightness that is determined by the content data.

At step 1203, the projector display device modulates the emitted light. In one example, the controller 1113 causes the optical modulator 1112 to perform a spatially varying modulation on light emitted by the light source 1111. At step 1204, the projector display device adjusts a light level thereof based on the content data and based on a metadata relating to a future frame. In this manner, the projection display device reduces a perceptibility of a visual artifact. For example, the controller 1113 may receive the metadata from an internal or external data source and adjust the light source 1111 accordingly.

The controller 1113 may be configured to adjust the light source 1111 in a number of ways. For example, the controller may adjust a light level emitted by the light source 1111 by performing a partial dimming, by performing an SBO compensation, by compressing a dynamic range, and the like. In adjusting the light level, the controller 1113 may perform a pulse skipping on the light source 1111 itself, an amplitude modulation on the light source 1111 itself, an attenuation on light emitted from the light source 1111, and the like. Where the light source 1111 is made up of multiple individual light sources, the controller 1113 may adjust light levels for the light sources collectively or independently. In some examples, steps 1202-1204 may be performed repeatedly on a frame-by-frame basis to thereby display a moving (video) image. The particular adjustment may be implemented using any one or more of the dimming techniques described above.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain aspects of the present disclosure, and should in no way be construed so as to limit the claims.

Accordingly, it is to be understood that the above description is intended to be illustrative and not restrictive. Many aspects and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

Various aspects of the present disclosure may take the form of any one or more of the following configurations:

(1) A projection display system, comprising: a light source configured to emit a light in response to a content data; an optical modulator configured to modulate the light; and a controller configured to adjust a light level of the projection display system based on the content data and a metadata relating to a future frame, thereby to reduce a perceptibility of a visual artifact.

(2) The projection display system according to (1), wherein the content data includes an image data and at least one of an ambient condition data, the metadata relating to the future frame, a mastering metadata, a color grading metadata, or a projector capability data.

(3) The projection display system according to (2), wherein the projector capability data includes a data corresponding to a veiling glare characteristic of the projection display system.

(4) The projection display system according to (2) or (3), wherein the ambient condition data includes at least one of a data corresponding to a room reflection characteristic, a data corresponding to a screen gain, or a data corresponding to an ambient light level.

(5) The projection display system according to any one of (1) to (4), wherein the controller is configured to adjust the light level of the projection display system by performing a partial dimming.

(6) The projection display system according to any one of (1) to (5), wherein the controller is configured to adjust the light level of the projection display system by adjusting at least one of a brightness of the light source or a rate-of-change of the brightness of the light source.

(7) The projection display system according to any one of (1) to (6), wherein the controller is configured to adjust the light level of the projection display system by performing a small-bright-object compensation.

(8) The projection display system according to any one (1) to (7), wherein the controller is configured to adjust the light level of the projection display system by compressing a dynamic range.

(9) The projection display system according to any one of (1) to (8), wherein the light source is a laser light source configured to emit the light.

(10) The projection display system according to (9), wherein the controller is configured to adjust the light level of the projection display system by performing at least one of a pulse skipping on the laser light source, an amplitude modulation on the laser light source, or an attenuation on the light.

(11) The projection display system according to any one of (1) to (10), wherein the light source includes a first light emission device configured to emit a first color light, a second light emission device configured to emit a second color light, and a third light emission device configured to emit a third color light.

(12) The projection display system according to (11), wherein the controller is configured to adjust a light level for the first color light, the second color light, and the third color light independently.

(13) The projection display system according to (11), wherein the controller is configured to adjust a light level for the first color light, the second color light, and the third color light collectively.

(14) The projection display system according to any one of (1) to (13), wherein the visual artifact is a dark pumping effect.

(15) A non-transitory computer-readable-medium storing instructions that, when executed by a processor of a projection display system comprising a light source and an optical modulator, cause the projection display system to perform operations comprising: receiving a content data; emitting a light, by the light source, in response to the content data; modulating the light, by the optical modulator; and adjusting a light level of the projection display system based on the content data and a metadata relating to a future frame, thereby to reduce a perceptibility of a visual artifact.

(16) The non-transitory computer-readable-medium according to (15), wherein the content data includes an image data and at least one of an ambient condition data, the metadata relating to the future frame, a mastering metadata, a color grading metadata, or a projector capability data.

(17) The non-transitory computer-readable-medium according to (16), wherein the projector capability data includes a data corresponding to a veiling glare character-istic of the projection display system.

(18) The non-transitory computer-readable-medium according to (16) or (17), wherein the ambient condition data includes at least one of a data corresponding to a room reflection characteristic, a data corresponding to a screen gain, or a data corresponding to an ambient light level.

(19) The non-transitory computer-readable-medium according to any one of (15) to (18), wherein the adjusting the light level of the projection display system includes performing a partial dimming.

(20) The non-transitory computer-readable-medium according to any one of (15) to (19), wherein the adjusting the light level of the projection display system includes adjusting at least one of a brightness of the light source or a rate-of-change of the brightness of the light source.

(21) The non-transitory computer-readable-medium according to any one of (15) to (20), wherein the adjusting the light level of the projection display system includes performing a small-bright-object compensation.

(22) The non-transitory computer-readable-medium according to any one (15) to (21), wherein the adjusting the light level of the projection display system includes com-pressing a dynamic range.

(23) The non-transitory computer-readable-medium according to any one of (15) to (22), wherein the light source is a laser light source configured to emit the light.

(24) The non-transitory computer-readable-medium according to (23), wherein the adjusting the light level of the projection display system includes performing at least one of a pulse skipping on the laser light source, an amplitude modulation on the laser light source, or an attenuation on the light.

(25) The non-transitory computer-readable-medium according to any one of (15) to (24), wherein emitting the light includes: emitting a first color light by a first light emission device of the light source; emitting a second color light by a second light emission device of the light source; and emitting a third color light by a third light emission device of the light source.

(26) The non-transitory computer-readable-medium according to (25), wherein the adjusting the light level of the projection display system includes adjusting a light level for the first color light, the second color light, and the third color light independently.

(27) The non-transitory computer-readable-medium according to (25), wherein the adjusting the light level of the projection display system includes adjusting a light level for the first color light, the second color light, and the third color light collectively.

(28) The non-transitory computer-readable-medium according to any one of (15) to (27), wherein the visual artifact is a dark pumping effect.

What is claimed is:

1. A projection display system, comprising:
a light source configured to emit a light in response to a content data;
an optical modulator configured to modulate the light; and a controller configured to obtain ambient condition data and configured to reduce the perceptibility of a dark pumping visual artifact by adjusting a maximum allowed rate-of-change of a brightness of the light source based on the ambient condition data.

2. The projection display system according to claim 1, wherein the controller is configured to adjust the brightness of the light source based on the content data.

3. The projection display system according to claim 1, wherein the controller is configured to adjust the brightness of the light source based on the content data and based on the ambient condition data.

4. The projection display system according to claim 1, wherein the ambient condition data includes data corre-sponding to ambient light levels, wherein the controller is configured to limit the maximum allowed rate-of-change of the brightness of the light source to a first rate when the ambient light level is at a first ambient light level, wherein the controller is configured to limit the maximum allowed rate-of-change of the brightness of the light source to a second rate when the ambient light level is at a second ambient light level, wherein the second rate is greater than the first rate, and wherein the second ambient light level is greater than the first ambient light level.

5. The projection display system according to claim 1, wherein the ambient condition data includes a room reflec-tion characteristic, wherein the controller is configured to limit the maximum allowed rate-of-change of the brightness of the light source to a first rate when the room reflection characteristic is at a first level, wherein the controller is configured to limit the maximum allowed rate-of-change of the brightness of the light source to a second rate when the room reflection characteristic is at a second level, wherein the second rate is greater than the first rate, and wherein the second level is greater than the first level.

6. The projection display system according to claim 1, wherein the light source includes a first light emission device configured to emit a first color light, a second light emission device configured to emit a second color light, and a third light emission device configured to emit a third color light.

7. The projection display system according to claim 6, wherein the controller is configured to adjust a light level for the first color light, the second color light, and the third color light independently.

8. The projection display system according to claim 6, wherein the controller is configured to adjust a light level for the first color light, the second color light, and the third color light collectively.

9. A projection display system, comprising:
a light source configured to emit a light in response to a content data including soundtrack volume;
an optical modulator configured to modulate the light; and
a controller configured to limit dimming of the brightness of the light source to no less than a first brightness level when the soundtrack volume is at a first sound level, wherein the controller is configured to limit dimming of the brightness of the light source to no less than a second brightness level when the soundtrack volume is at a second sound level, wherein the second brightness level is greater than the first brightness level, and wherein the second sound level is greater than the first sound level.

10. The projection display system according to claim 9, wherein the controller is configured to adjust the brightness of the light source based on the content data.

11. The projection display system according to claim 9, wherein the light source includes a first light emission device configured to emit a first color light, a second light emission device configured to emit a second color light, and a third light emission device configured to emit a third color light.

12. The projection display system according to claim 11, wherein the controller is configured to adjust a light level for the first color light, the second color light, and the third color light independently.

13. The projection display system according to claim 11, wherein the controller is configured to adjust a light level for the first color light, the second color light, and the third color light collectively.

14. A non-transitory computer-readable-medium storing instructions that, when executed by a processor of a projection display system comprising a light source and an optical modulator, cause the projection display system to perform operations comprising:

receiving a content data;

receiving an ambient condition data;

emitting a light, by the light source, in response to the content data;

modulating the light, by the optical modulator; and reducing a perceptibility of a dark pumping visual artifact by adjusting a maximum allowed rate-of-change of a brightness of the light source based on the ambient condition data.

15. The non-transitory computer-readable-medium according to claim 14, wherein the ambient condition data includes data corresponding to ambient light levels, wherein the instructions, when executed, further cause the projection display system to limit the maximum allowed rate-of-change of the brightness of the light source to a first rate when the ambient light level is at a first ambient light level and to limit the maximum allowed rate-of-change of the brightness of the light source to a second rate when the ambient light level is at a second ambient light level, wherein the second rate is greater than the first rate, and wherein the second ambient light level is greater than the first ambient light level.

16. The non-transitory computer-readable-medium according to claim 14, wherein the ambient condition data includes a room reflection characteristic, wherein the instructions, when executed, further cause the projection display system to limit the maximum allowed rate-of-change of the brightness of the light source to a first rate when the room reflection characteristic is at a first level and to limit the maximum allowed rate-of-change of the brightness of the light source to a second rate when the room reflection characteristic is at a second level, wherein the second rate is greater than the first rate, and wherein the second level is greater than the first level.

* * * * *